C. N. SIMPSON.
ATTACHMENT FOR RIDING CULTIVATORS AND OTHER AGRICULTURAL IMPLEMENTS.
APPLICATION FILED APR. 29, 1909.
936,823.
Patented Oct. 12, 1909.
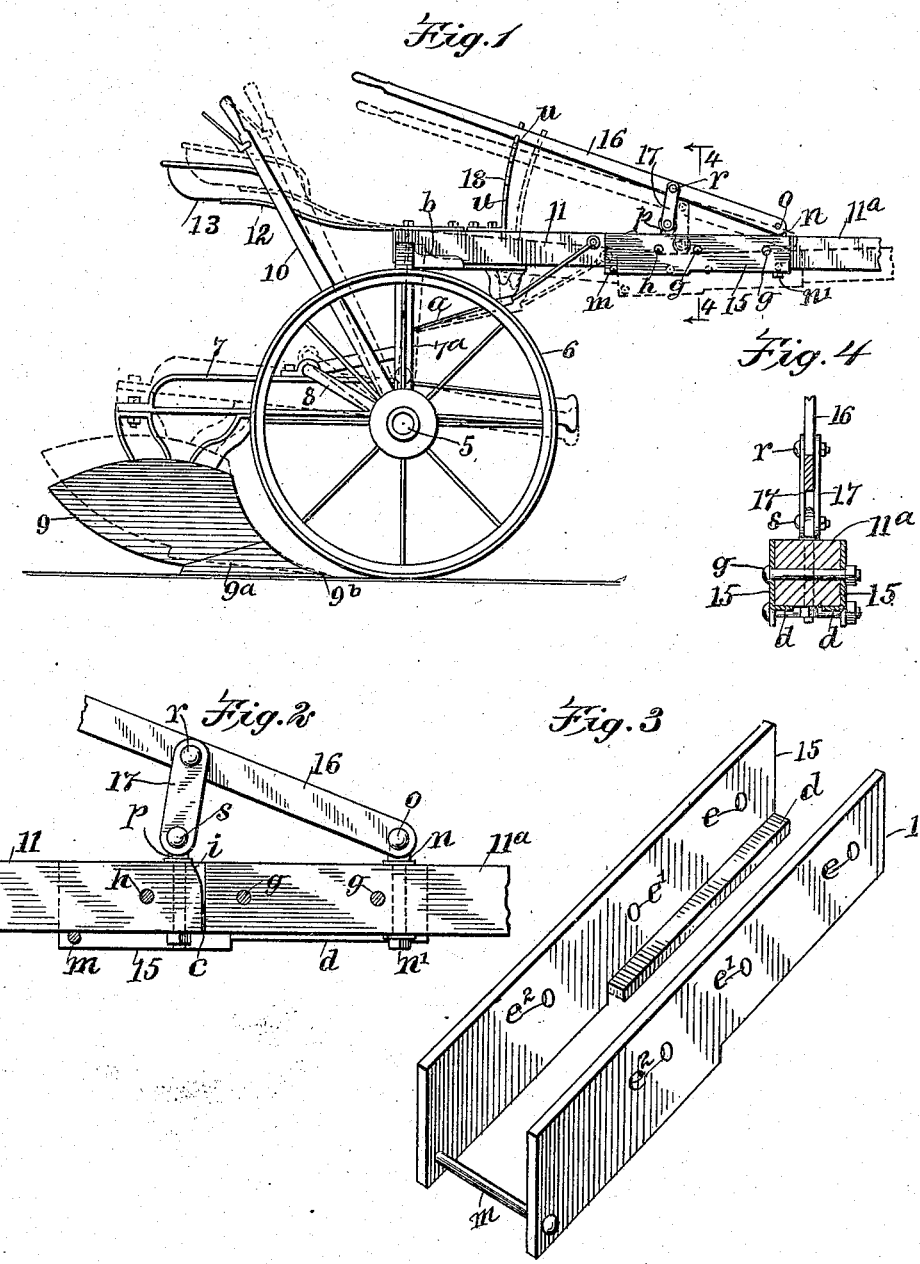
WITNESSES
INVENTOR
Charles N. Simpson
BY
ATTORNEYS

UNITED STATES PATENT OFFICE.

CHARLES NEIL SIMPSON, OF BRYAN, TEXAS.

ATTACHMENT FOR RIDING-CULTIVATORS AND OTHER AGRICULTURAL IMPLEMENTS.

936,823.  Specification of Letters Patent.  Patented Oct. 12, 1909.

Application filed April 29, 1909. Serial No. 492,817.

*To all whom it may concern:*

Be it known that I, CHARLES N. SIMPSON, a citizen of the United States, and a resident of Bryan, in the county of Brazos and State of Texas, have invented a new and Improved Attachment for Riding-Cultivators and other Agricultural Implements, of which the following is a full, clear, and exact description.

It is well known that in riding plows and cultivators the points of the plows and cultivator blades have a tendency to approach the surface of the ground if the latter is undulating, which causes the implement to operate imperfectly and produce a furrow that is deep or shallow in uneven ground.

The purpose of my invention is to provide novel details of construction for an attachment that may with but slight changes in the implement, be placed upon a riding plow, a riding cultivator or a planter, and enable an exact control of the implement, so that the plows proper, or cultivator blades may be instantly changed in adjustment, to lower or raise their points in conformity with the changes in inclination of the surface of the ground operated upon, thus insuring an equal proper depth of furrow, or agitation of the soil, both in level and undulating ground, and when the implement is turned at a fence row.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a side view of a riding plow showing details of the invention thereon in full and dotted lines; Fig. 2 is an enlarged side view of the attachment mounted upon a tongue for a riding plow; Fig. 3 is a detached perspective view of main details of the invention; and Fig. 4 is a transverse sectional view, substantially on the line 4—4 in Fig. 1.

The improved attachment is applicable to riding plows and other agricultural implements of a like character, that are provided with a tongue and neck yoke.

In the drawings, the invention is shown mounted upon a riding plow of ordinary construction, which will be briefly described, to enable a proper understanding of the improvement that is combined therewith.

As shown in Fig. 1, 5 indicates an axle whereon duplicate ground wheels 6 are mounted, one appearing in the view. On the axle 5, a frame 7 is mounted, and at the sides of said frame a yoke 8 is rockably mounted upon the axle. Upon the frame and yoke, a plow consisting of a mold board 9 and plow share $9^a$ that terminates forwardly in a point $9^b$, is mounted. The plow is as usual in this class of implements, adapted for upward rocking movement from its normal position by a lever 10, this provision enabling the removal of the plow from contact with the ground, when the implement is transferred to or from the field it is to be used in for plowing the soil. On the rockable frame 7, an upright frame $7^a$ is mounted, whereon the rear portion 11 of a tongue is mounted, and held rigid in a horizontal position on the frame $7^a$ by braces $a$ and $b$. An arm 12 projects rearward from the rear portion of the tongue, and on the rear end of said arm a seat plate 13 is secured, affording a seat for accommodation of the driver of the team that draws the plow.

The construction of the parts that have been described are common to riding plows of a class that embodies a tongue for the attachment of draft animals to the plow, and it is to be understood that a riding plow having two plow blades or more, that may be used as a cultivator, may be provided with the improvement.

In the present embodiment of the invention, the tongue as an entirety is of usual length, and as shown, consists of a beam of wood that is rectangular in cross section. At a suitable point forward of the rear end of the rigidly-secured rear portion 11 of the tongue, the body of the latter is severed from the forward portion $11^a$ thereof by a transverse cut, as shown at $c$ in Fig. 2, the two sections of the tongue being rockably connected together so that the forward portion $11^a$ may be disposed level, or rocked from a horizontal plane when connected by details of the invention that will now be described.

Two bracket plates 15 of similar form, constitute important features of the improvement, each plate consisting of an elongated flat metallic plate of suitable length and thickness. The bracket plates 15 are substantially rectangular edgewise, and on the lower edge of each one a flange d is formed, that extends from the forward end thereof rearward about one-half of the length of said plate. Preferably three perforations e, e', e² are formed in each bracket plate, these perforations being disposed oppositely at points near the center of width of the plate, and at proper distances apart, the perforations e being positioned near the forward ends of the bracket plates, as shown in Fig. 3. In securing the bracket plates 15 upon the forward portion 11ᵃ of the tongue, the flanges d engage the lower side thereof, projecting toward each other, and if preferred may be embedded in a shallow recess formed in the lower side of the tongue. The perforations e, e', that are positioned oppositely in pairs, are connected together by transverse perforations formed in the tongue section 11ᵃ, and in each pair of said perforations a bolt g is inserted and secured by a nut on its projected end.

As shown in Fig. 2, the bracket plates 15 are so relatively positioned on the tongue section 11ᵃ that a rear portion of each bracket plate laps upon the fixed rear section 11 of the tongue, thus disposing the perforations e² opposite each other and near the forward end of said section. The perforations e² are connected together by a transverse perforation formed in the tongue section 11, and through the alined perforations e², a pivot bolt h is inserted and secured therein by a nut on its end or by equivalent means.

The means for connecting the front section 11ᵃ of the tongue with the rear portion 11 thereof, is designed to permit a limited upward rocking movement to be given to the forward tongue section 11ᵃ, and to facilitate such an adjustment the upper corner of the fixed rear section 11 is removed and the surface rounded as appears at i in Fig. 2.

The bracket plates 15 rearward of the flanges d project somewhat below the body of the tongue section 11, and in said depending portions of the bracket plates near the rear ends thereof, a perforation is formed oppositely in each plate, wherein a cross bolt m is secured. It will be seen that the bolt m has contact with the lower side of the fixed section 11 of the tongue when the forward section 11ᵃ is level with the rear section on their upper sides, which adapts the tongue for service when the implement is used to plow level ground, or when there is but a slight undulation in the surface of the soil.

To control the upward rocking adjustment of the forward section 11ᵃ for the tongue, convenient means are provided that consist of the following details: At the transverse center of the tongue section 11ᵃ, near the forward bolt g, a vertical perforation is formed therein that receives an eye-bolt n, which is inserted downwardly and secured in place by a nut n' on its lower end. A lever 16 is pivoted by its forward end on the head of the eye-bolt n, as shown at o in Figs. 1 and 2. At a proper distance rearward from the eye-bolt n, a similar eye-bolt p is secured in a vertical perforation formed centrally in the tongue section 11. The head of the eye-bolt p is connected with the lever 16 by means of two flat link plates 17 that are oppositely lapped upon the lever and eye-bolt, the means of connection being as follows: The ends of the link plates 17 that lap upon the lever 16 are perforated in alinement with a perforation in said lever, and are therewith connected by a transverse pivot bolt r, as shown in the drawings. In a like manner, the lower ends of the link plates 15 are oppositely perforated, and a pivot bolt s is inserted through said perforations and through the intervening head of the eye-bolt p.

On the fixed section 11 of the tongue, a keeper arm 18 is secured that is formed of flat iron bar that is preferably curved as shown in Fig. 1, said arm having one or both side edges thereof provided with hook-like teeth u that are spaced apart a proper distance. The toothed edge of the keeper arm 18 is disposed in the path of the lever 16 so that the lower edge of said lever may be hooked upon any one of the teeth u by a proper rocked adjustment of the lever. As the rear end of the lever 16 is extended toward and near to the seat plate 13, it will be seen that the driver occupying said seat may readily manipulate the lever. If the soil being plowed or cultivated by the implement is quite uneven, so that the points of the plow or cultivator blades rise toward the surface of the soil and fail to do proper work, this may be readily prevented by the rider on the implement, by a proper adjustment of the lever 16. In further explanation, it will be noted that the linked connection of the lever 16 with the forward end of the fixed section 11 for the tongue, affords a purchase or fulcrum, thus adapting the upward rocking movement of the lever, to depress the rear end of the forward section of the tongue. It will also be noted that as the fixed tongue section 11 is mounted upon the upright frame 7ᵃ, that is projected from the plow frame 7, and thus adapted to receive rocking adjustment along with said frame on the axle 5, the tongue section 11 will correspondingly rock downward at its front end, these adjustments of the tongue sections appearing in Fig. 1 where they are indicated by dotted lines. Obviously, when the frame 7 is permitted to rock downward at its front end, the points of the plow or cultivator blades will be correspondingly depressed in a degree controlled by the adjustment of the lever 16. When the ground traversed in the operation of the plow or cultivator is level, or nearly so, the plow or cultivator may have their points instantly restored to a normal level condition by a proper upward adjustment of the lever 16.

It will be seen from the described construction of the improvement that it may be readily applied upon a riding plow, cultivator or planter having a tongue that is supported at the front end from the necks of the draft animals, and enable the driver on the implement to keep the points of the plows or cultivator blades at a proper depth and compensate for an undulating surface on the soil operated upon with the machine.

Having thus described my invention, I claim as new and desire to secure by Letters Patent:

1. In an agricultural implement, the combination of a sectional tongue, means for hinging the tongue sections together to swing vertically, a lever pivoted to the forward section, a link connection between the lever and the rear section, and means for locking the lever in position.

2. In an agricultural implement, the combination with a bisected tongue, of means for hinging adjacent ends of the tongue sections together to swing vertically, comprising two bracket plates fixedly secured on opposite sides of an end portion of one tongue section and pivoted upon the adjacent end of the other tongue section affording a hinge joint between said sections, and means for controlling the adjustment of the two sections.

3. In an agricultural implement, the combination with a bisected tongue, of means for hinging adjacent ends of the tongue sections together, comprising two oblong rectangular bracket plates fixedly secured on opposite sides of the forward section of the tongue, and at the rear ends thereof engaging the rear tongue section whereon said plates are pivoted, a check bolt in the plates disposed transversely below the rear tongue section, a lever pivoted by its front end on the front tongue section, a loose connection between the lever and the front end of the rear tongue section, and means for controlling the rocked adjustment of the lever.

4. In an agricultural implement, the combination with a bisected tongue, of means for hinging adjacent ends of the tongue sections together to swing vertically, comprising two oblong rectangular plates having opposite flanges on their lower edges, said plates being bolted on the forward section of the tongue and the flanges thereon engaging the lower side of said section, the rear portions of the plates embracing the rear section of the tongue, a pivot bolt connecting said engaging portions of the plates upon the rear tongue section, an eye-bolt on the forward tongue section, a lever pivoted by its forward end upon said eye-bolt, link plates pivoted at their upper ends on the lever rearwardly from the forward end thereof, the lower ends of said link plates being pivoted upon an eye-bolt projected from the rear sections of the tongue, and a ratchet-toothed arm on the rear tongue section whereon the lever is adjustably secured.

In testimony whereof I have signed my name to this specification in the presence of two subscribing witnesses.

CHARLES NEIL SIMPSON.

Witnesses:
F. T. O. BOATWRIGHT,
R. W. HOWELL.